Sept. 24, 1968     P. E. McMORROW     3,402,485
ANIMAL TRACK FOOTWEAR SOLES

Filed May 13, 1966     3 Sheets-Sheet 1

*Inventor*
Philip E. McMorrow
By his Attorney

Sept. 24, 1968                P. E. McMORROW                3,402,485
                          ANIMAL TRACK FOOTWEAR SOLES
Filed May 13, 1966                                          3 Sheets-Sheet 3

United States Patent Office 3,402,485
Patented Sept. 24, 1968

3,402,485
ANIMAL TRACK FOOTWEAR SOLES
Philip E. McMorrow, Beverly, Mass., assignor to United Shoe Machinery Corporation, Flemington, N.J., a corporation of New Jersey
Filed May 13, 1966, Ser. No. 550,011
1 Claim. (Cl. 36—25)

This invention relates to footwear and is directed more particularly to footwear for laying simulated animal tracks for either educational purposes or mere amusement.

Because of the continuous depletion of the wildlife population of the world, it is becoming increasingly difficult to train wildlife experts, conservationists, forest rangers, Boy Scouts and the like in the art of tracking various wild animals. The time when a multitude of animal tracks could be observed in the learning process has passed in many parts of the world, particularly North America. Increasingly, institutions and organizations concerned with wildlife turn to the use of projection slides, drawings and photographs in teaching the tracking art to those who require such knowledge. While such media have proved helpful, they are generally only available, or at least find greatest utility, in the classroom rather than in the field, denying the student the opportunity to see the track in its natural surroundings.

Accordingly, it is an object of the present invention to provide means for simulating the tracks of various wild animals.

It is a further object of the invention to provide a footwear sole having a tread surface simulating the bottom of an animal paw, claw, hoof or the like for the laying of animal tracks.

It is a still further object of the invention to provide footwear having a sole which is adapted to leave tracks in soft earth for the purpose of serious instruction or for games and amusement.

With the above and other objects in view, as will hereinafter appear, the present invention in one aspect thereof contemplates the provision in a molded shoe sole of a tread surface having as a molded portion thereof the simulation of at least one animal foot, the simulation extending sufficiently beyond the normal tread surface of the sole so that in moderately soft soil only the imprint of the simulated animal foot is made by a person wearing the shoe.

Reference is made to the accompanying drawings in which there is shown an illustrative embodiment of the invention from which its novel features and advantages will be apparent.

Figure 1:
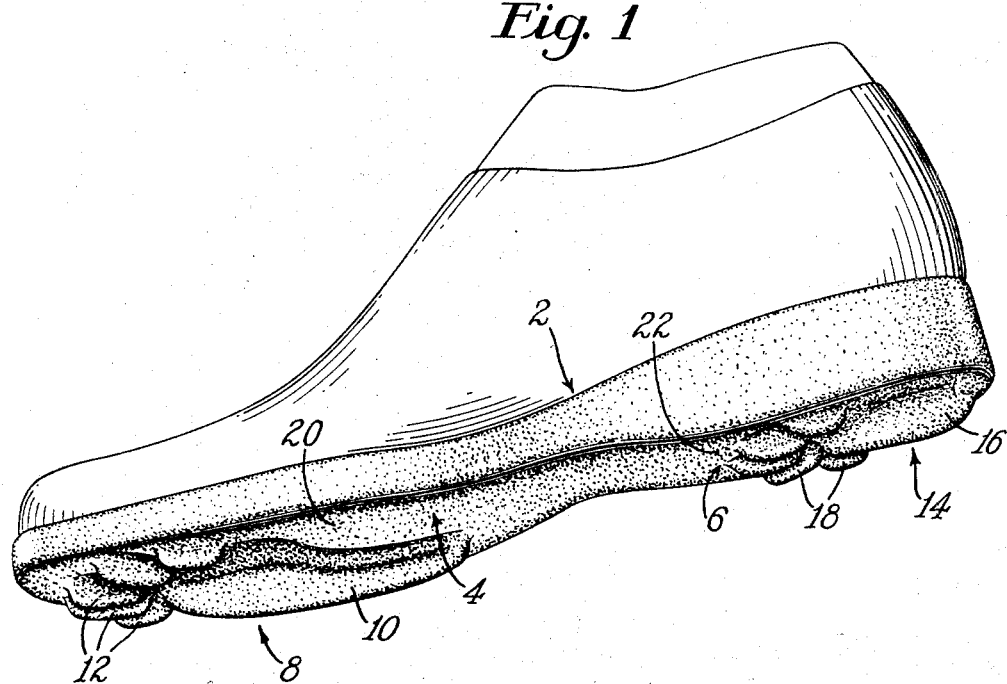
FIG. 1 is a perspective view of a shoe having a molded sole embodying one form of the invention.
Figure 2:
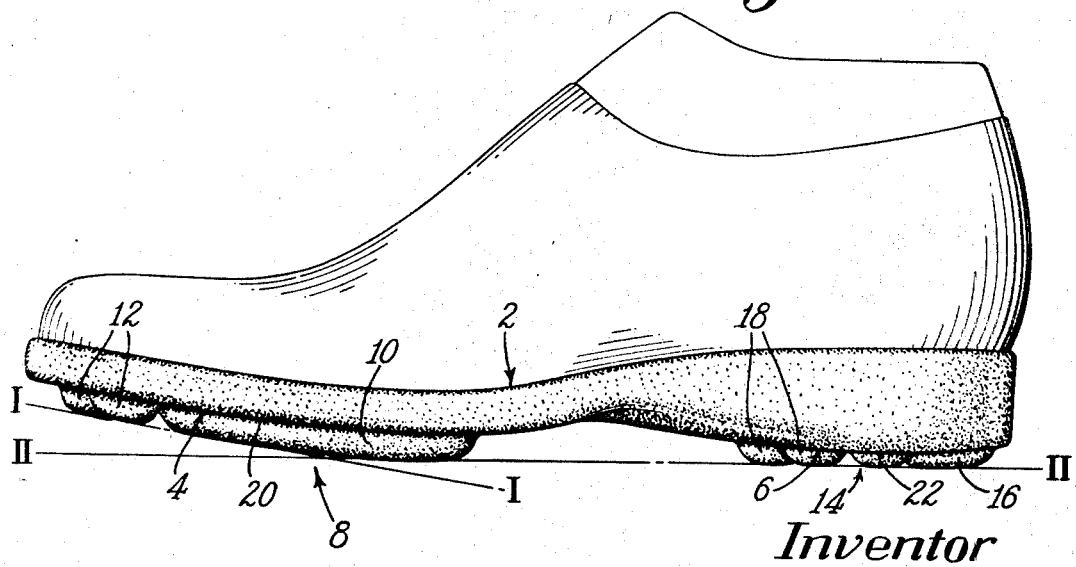
FIG. 2 is an elevational view of the shoe shown in FIG. 1.
Figure 3:
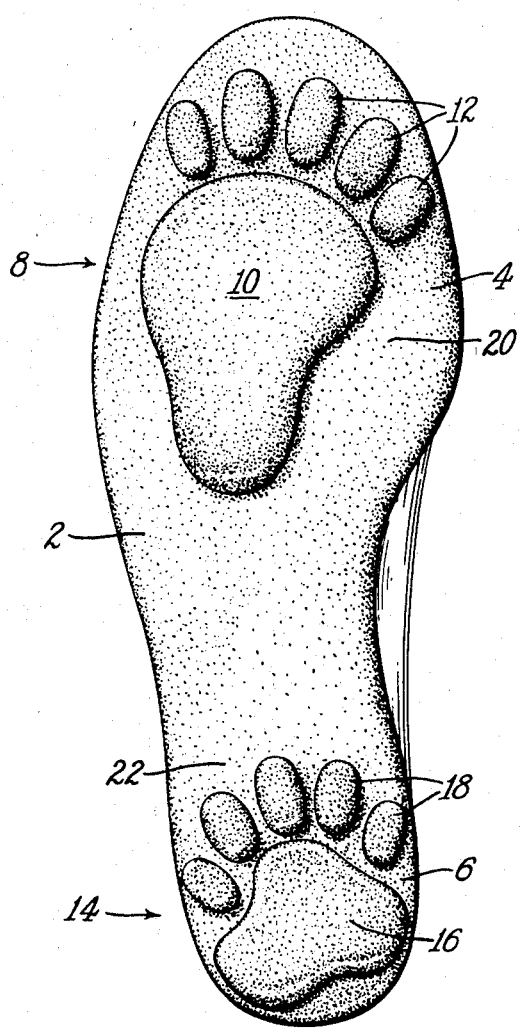
FIG. 3 is a bottom view.

Referring to FIGS. 1-3, it may be seen that the illustrative shoe sole comprises a molded sole 2 having a forepart portion 4 and a heel portion 6. The forepart portion 4 is provided with a molded-on simulation 8 of a hind foot of a Kodiak brown bear comprising a hind foot pad 10 and hind toe pads 12. The heel portion 6 is provided with a molded-on simulation 14 of a front foot pad 16 and front toe pads 18. The pads 10, 12, 16 and 18 are molded as integral parts of the sole 12 and, as shown in FIG. 2, comprise a tread surface projecting from surfaces 20, 22 which otherwise would constitute the tread surface of the forepart and heel portion 4, 6 respectively. When the shoe is resting on a plane such as I—I or II—II in FIG. 2, the protruding tread surface formed by the simulations 8, 14 entirely separates the plane I—I or II—II and the surfaces 20, 22. Accordingly, when such a shoe is worn, imprints made in the ground are normally formed entirely from the animal foot simulations 8, 14 and not the surface 20, 22 of the sole.

A Kokiak brown bear has been chosen as an illustrative example because it is one of a group of animals which leaves tracks in groups of two, the two tracks of a group being in substantial alignment with each other and with the direction of travel of the animal. For example, referring to FIG. 4, it may be seen that the left front track $lf$ and the left hind track $lh$ form a group L and are in substantial alignment one with the other. In like manner the right front track $rf$ and right hind track $rh$ form a group R of two tracks in which both tracks are in substantial alignment. Thus, shoe soles made in accordance with the present invention may be used to impart tracks to soft soil which substantially approximate the tracks left by a brown bear. Other animals which leave tracks in groups of two, one group comprising left front and left hind tracks and alternate groups comprising right front and right hind tracks, and whose tracks within a group are in substantial alignment with the direction of travel, include, among other, the wildcat and the mountain lion.

For use in games or amusement it will be readily apparent that the simulations molded onto the soles need not be particularly accurate or realistic. For example, the size of the animal foot and the precise pattern of tracks left by the animal need not be seriously considered. However, when used for serious instructional purposes, it is important that the size of the animal's foot and the spacing and the pattern of the animal's natural tracks be closely considered. In addition, the speed at which an animal travels will affect the tracks left by the animal, and must be considered in the forming of the sole bottoms.

Figure 4:
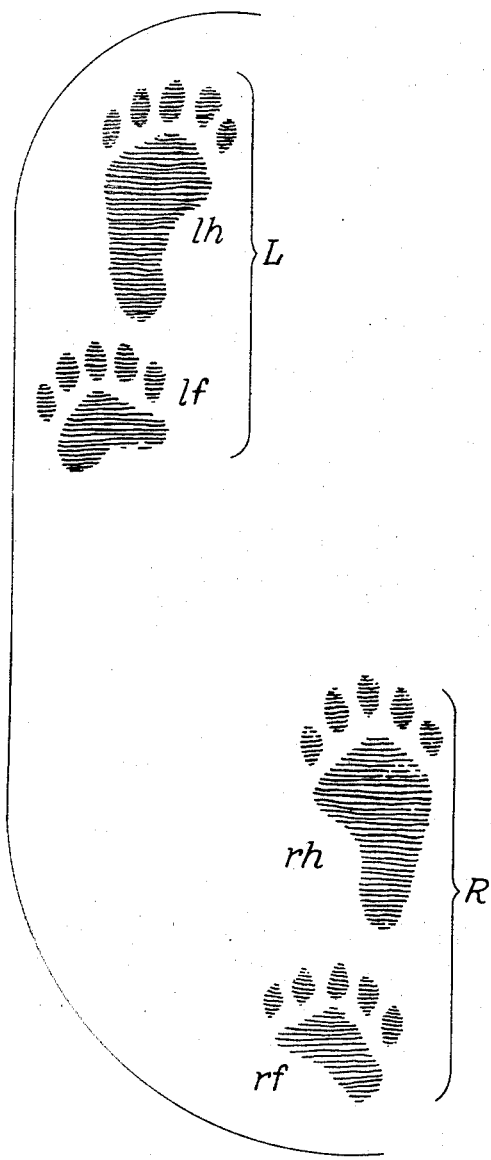
FIG. 4 shows a scaled-down representation of tracks made by a Kodiak brown bear cub.
Figure 5:
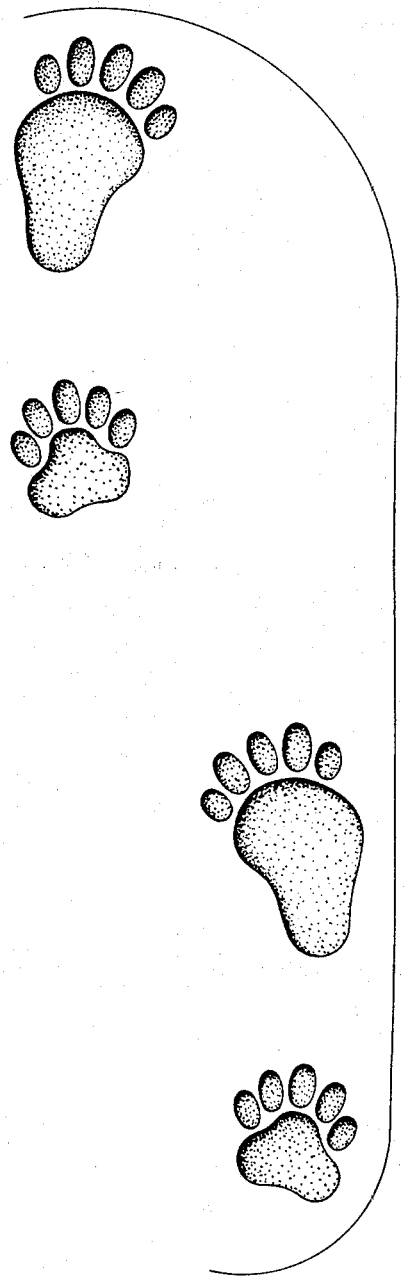
FIG. 5 shows a representation drawn to the same scale as FIG. 4, of tracks made by a person wearing a pair of shoes such as that shown in FIGS. 1-3.

Referring to FIG. 5, there are shown, in the same scale as FIG. 4, representations of the tracks left by an adult human wearing an approximately size ten shoe having the brown bear simulations molded thereon. A size ten shoe has been selected for illustrative purposes because of the closeness in size of the forepart and heel portions to the front and hind feet of an average bear cub. A comparison of FIGS. 4 and 5 will show substantial similarity between the tracks left by a walking brown bear cub and those left by an adult human. It is important that the simulations protrude sufficiently from the normal tread surfaces 20, 22 of the sole to provide an animal track in moderately soft soil without leaving the imprint of a shoe in the soil. Of course, if shoes having such soles are worn frequently, as by children wearing such shoes for amusement, the molded animal pads will eventually wear thin. However, in such instances, after the "toy" has worn away, the child is left with a shoe which is still usable for the usual life of an ordinary shoe.

As an alternative embodiment, particularly for serious instructional purposes, the simulated animal foot pads may be molded onto the tread surface of a slip-on type sole or "rubber" overshoe. Thus, at relatively little expense a wildlife or game department or Boy Scout troop can maintain several sets of soles for simulating tracks of various animals, the soles being easily slipped over ordinary shoes for use in tracking instruction.

Since obvious changes may be made in the illustrated invention without departing from the scope of the invention, it is intended that all matters contained herein be interpreted in an illustrative and not a limiting sense.

Having thus described my invention, what I claim as new and desire to secure by Letters Patent of the United States is:

1. A molded footwear sole for laying of simulated tracks of an animal,
   said sole comprising
   a forepart portion having a normal tread surface,
   a heel portion having a normal tread surface,
   projecting sole portions integral with the forepart portion and extending beyond the normal tread surface of the forepart portion, said projecting forepart portions being of a configuration and arrangement simulating the configuration and arrangement of bottom portions of a selected side first foot of a selected animal, and
   projecting sole portions integral with the heel portions and extending beyond the normal tread surface of the heel portion, said last named projecting sole portions being of a configuration and arrangement simulating the configuration and arrangement of bottom portions of a second foot of the same selected side of said selected animal,
   said projecting sole portions comprising a tread surface which, when said sole is resting on a plane, separates the entire normal tread surface of the sole from the plane, whereby upon pressing said sole into soil, as by walking, said sole imparts an imprint simulating that made by said animal.

References Cited

UNITED STATES PATENTS

| | | | |
|---|---|---|---|
| 1,528,819 | 3/1925 | Engel | 101—368 X |
| 1,655,326 | 1/1928 | Montine | 101—368 |
| 2,754,598 | 7/1956 | Aull | 36—1 |

JORDAN FRANKLIN, *Primary Examiner.*

ALFRED R. GUEST, *Assistant Examiner.*